Aug. 26, 1969     F. M. SARFF ET AL     3,463,462

VOLUME AND CONSISTENCY MEASURING MECHANISM

Filed Oct. 9, 1967     5 Sheets-Sheet 1

INVENTORS
Forest M. Sarff

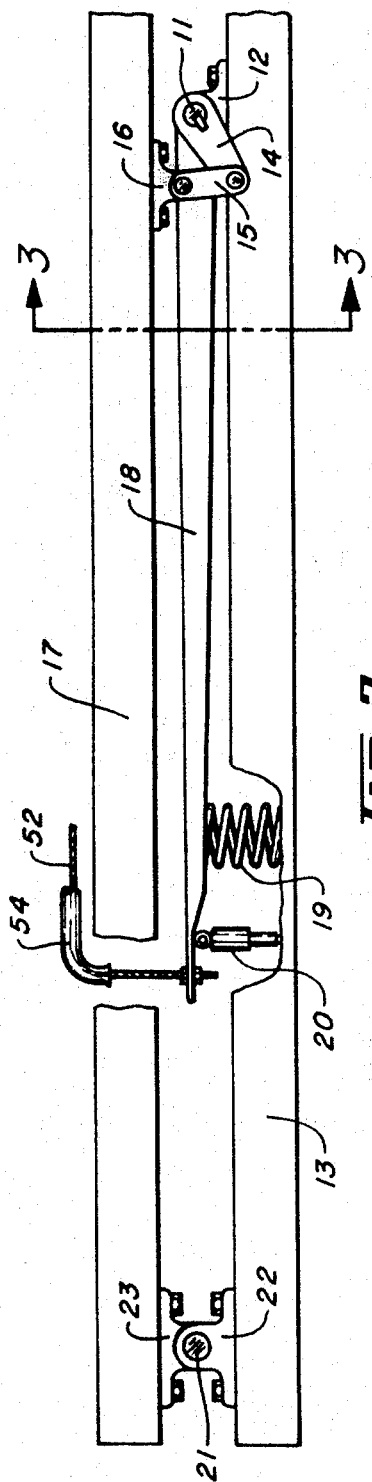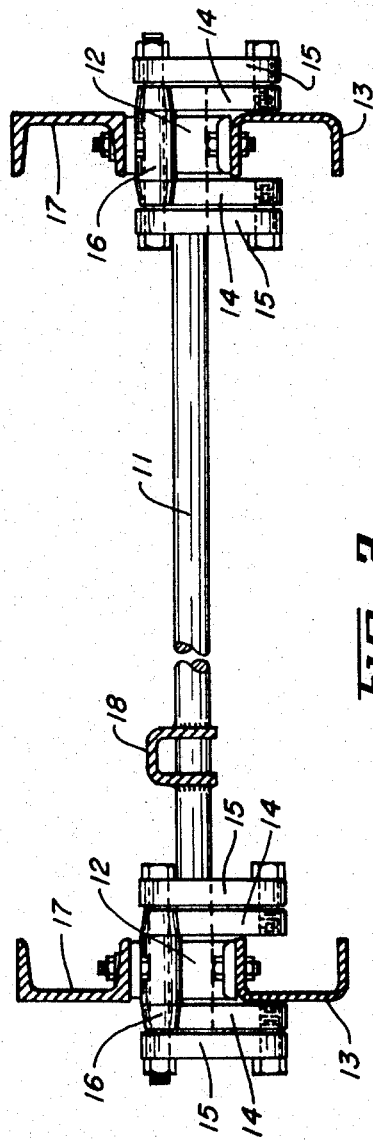

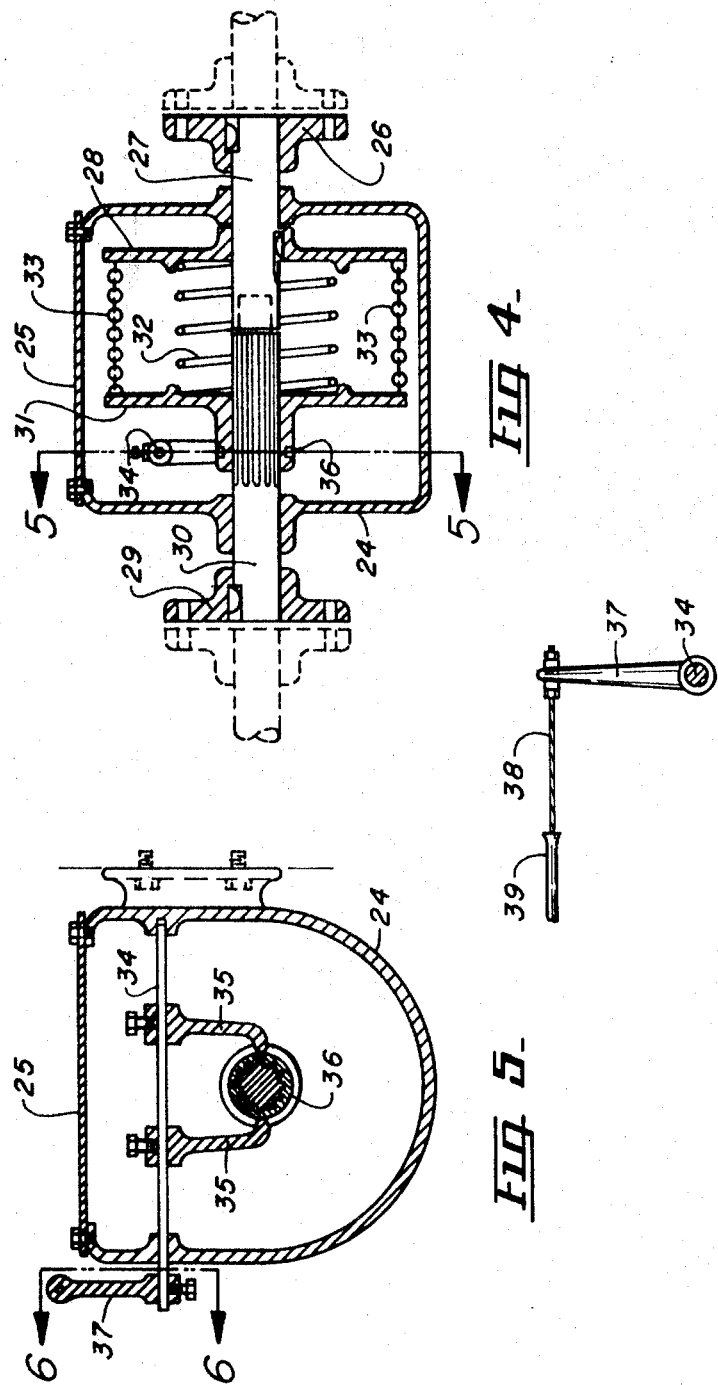

Aug. 26, 1969    F. M. SARFF ET AL    3,463,462
VOLUME AND CONSISTENCY MEASURING MECHANISM
Filed Oct. 9, 1967    5 Sheets-Sheet 4
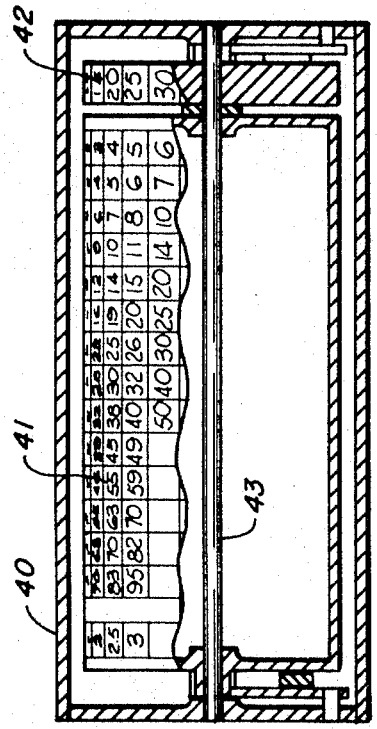
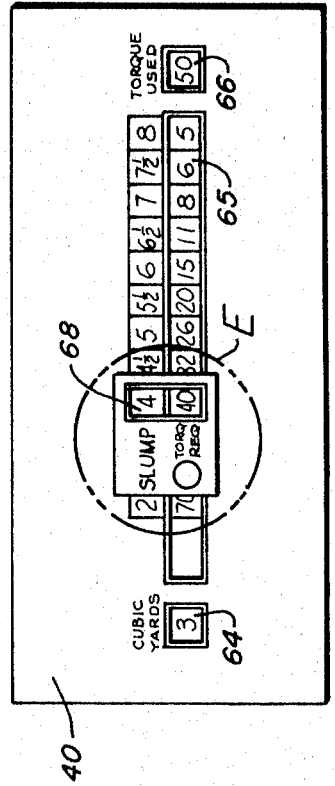
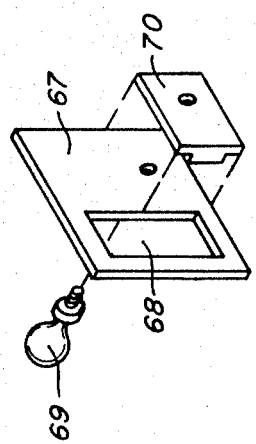
INVENTORS Aug. 26, 1969     F. M. SARFF ET AL     3,463,462
VOLUME AND CONSISTENCY MEASURING MECHANISM
Filed Oct. 9, 1967                    5 Sheets-Sheet 5

INVENTORS

United States Patent Office 3,463,462
Patented Aug. 26, 1969

3,463,462
VOLUME AND CONSISTENCY MEASURING MECHANISM
Forest M. Sarff, 19109 Newhouse St., Saugus, Calif. 91350, and Silas B. Birch, Jr., 9284 Dorrington Place, Arleta, Calif. 91332
Filed Oct. 9, 1967, Ser. No. 674,021
Int. Cl. B28c 7/04; G05d 11/12
U.S. Cl. 259—154                               5 Claims

ABSTRACT OF THE DISCLOSURE

This invention relates to volume and consistency measuring mechanisms, and more particularly to accessories to a mixing machine for indicating the volume and consistency of mixtures composed of several components such as concrete, including a solvent or wetting agent.

By utilizing principles which will significantly increase the accuracy of the consistency measurement taken at any instant, the present invention is in the nature of an improvement over previous devices such as were intended to continuously disclose the consistency of a concrete mixture in a mixing drum. In addition, the present invention provides for a simultaneous measurement of the volume of a mixture in a mixing drum at any instant by placing the mixing drum on a weighing device so that the total weight can be observed continuously.

Where a concrete mixture is involved, this invention will provide an accurate indication of the volume of concrete remaining in the mixing drum at any time, irrespective of how much concrete was in the mixing drum to start with, or how much has been discharged from the mixing drum. Simultaneously, it will continuously indicate the consistency of that mixture in the mixing drum and will indicate any change resulting from the addition of water, a wetting agent, or an admixture.

The need for the improvements provided in the present patent is apparent to all who are involved in determining the consistencies of mixtures existing in a mixing drum, particularly where the consistency must be modified to a prescribed value prior to discharging the mixture from the mixing drum. Where the volume of the mixture remaining in the mixing drum is critical with respect to the volume required in its intended use, there is a need to know the volume of the mixture in the mixing drum. The present patent also satisfies this need since it provides a means to continuously measure the volume remaining in the mixing drum.

This invention relates to volume and consistency measuring mechanisms, and more particularly to accessories to a mixing machine for indicating the volume and consistency of mixtures composed of several components such as concrete, including a solvent or wetting component.

It is an object of the present invention to provide a mechanism or series of related mechanisms for continuously measuring the volume of the component parts of a concrete mixture or other mixture in the mixing machine or drum.

Another object of the present invention is to provide a mechanism or series of related mechanisms for measuring the consistency of a concrete mixture or other mixture in the mixing machine or drum.

Still a further object of the present invention is to provide a means to determine the adjustment necessary in the quantity of solvent or wetting component (such as the water content in a concrete mixture) to change the consistency of the mixure in the mixing machine or drum to the consistency desired.

Still a further object of the present invention is to provide a mechanism or series of mechanisms which is simple in construction and operation and can be easily installed on mixing machines or drums currently in use or incorporated in the design and fabrication of new mixing machines or drums.

Still additional objects, benefits, and advantages of this invention will become evident from a study of the following detailed description taken in conjunction with the accompanying drawings, in which:

FIGURE 2 is a side view of the quantity measuring mechanism encircled by A and B in FIGURE 1.

FIGURE 3 is another view of the quantity measuring mechanism taken on the line 3—3 of FIGURE 2 and looking in the direction of the arrows.

FIGURE 4 is a longitudinal sectional view of the consistency measuring mechanism encircled by C in FIGURE 1.

FIGURE 5 is a cross-sectional view of the consistency measuring mechanism taken at line 5—5 on FIGURE 4.

FIGURE 6 is a side view of the lever shown on FIGURE 5 taken on line 6—6 in the direction of the arrows.

FIGURE 7 is a partial sectional front view of the indicating mechanism encircled by D in FIGURE 1.

FIGURE 8 is a view of the front of the case of the indicating mechanism showing the slotted openings through which the calibrated cylinders are visible.

FIGURE 9 is a perspective view of the back of the slide assembly encircled by E on FIGURE 8.

FIGURE 10b is a cross-sectional view of another method of rotating the calibrated cylinders.

Figure 1:
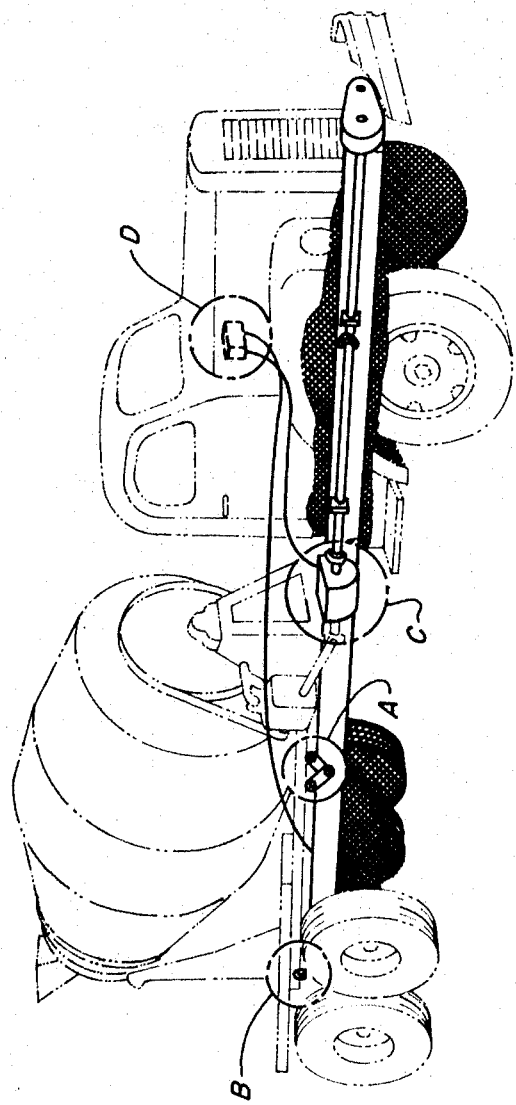
FIGURE 1 is a perspective view showing a concrete mixer mounted on a truck and the relative location of the various components of the continuous concrete quantity and consistency measuring and indicating mechanisms.

Referring now specifically to the drawings, the quantity measuring mechanism shown in FIGURE 2 and FIGURE 3, it consists of a shaft 11 supported on each end by pillow blocks 12 which are mounted on a frame 13; cranks 14 secured to shaft 11 and movably attached to links 15 which are also attached to pillow blocks 16 mounted on one end of the concrete mixer frame 17; a lever 18 secured on one end to shaft 11 and supported on the outboard end by a spring 19 and the motion of which is dampened by a shock-absorber 20; and the other end of the mixer frame 17 movably secured to frame 13 by pins 21 and pillow blocks 22 and 23.

Referring now specifically to the consistency measuring mechanism shown in FIGURE 4, FIGURE 5, and FIGURE 6, it consists of a case 24 and cover 25; a driving flange 26 secured to shaft 27 which in turn is secured to flange 28; a driven flange 29 secured to a splined shaft 30 upon which is movably mounted flange 31 with mating splines; spring 32 confined between flange 28 and flange 31; a series of flexible connectors 33 between flange 28 and flange 31; shaft 34 upon which is mounted levers 35, the ends of which track in groove 36 in the hub of flange 31; lever 37 secured to the outer end of shaft 34; and cable 38 which moves in sheath 39 with one end attached to lever 37.

Referring specifically to the calibrated indicating mechanism shown in FIGURE 7, FIGURE 8, FIGURE 9, and FIGURE 10, it consists of a case 40; cylinders 41 and 42 which rotate on shaft 43; gear 44 attached to cylinder 41, both of which are rotated by quadrant gear 46; link 47, which imparts motion to quadrant gear 46, is given motion through pins 48 by slotted levers 49 and pin 49a; dampening link 50 connects pin 49a to cable terminal 51; cable 52 attached to cable terminal 51, passes through spring 53 to sheath 54; threaded shaft 55 is attached to driven worm gear 58 and passes through a block 55a which rotates on pins 48; housing 56 to which levers 49 are secured by pins 57; driven worm gear 58 is rotated by drive worm gear 59 which is secured to shaft 60; crank 61 is movably mounted on the end of shaft 60 which extends outside case 40 and imparts rotation to shaft 60 through slot 62 and pin 63; slotted opening 64 through which the indicated quantity of concrete is shown; slotted opening 65 through which the calibrated cylinder 41 is visible; slotted opening 66 through which the developed torque is visible on cylinder 42; and sliding device 67 with an opening 68 and a knob 69, which device is movably attached to slotted opening 65 by retainer 70.

Figure 10A:
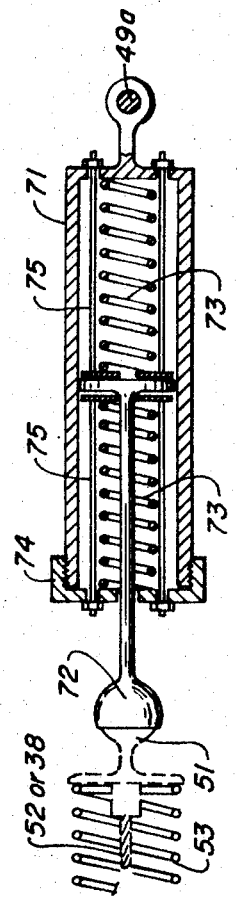
FIGURE 10a is a cross-sectional view of a shock dampening mechanism as used in the adjustable linkage assembly for the calibrated cylinders.
Figure 10:
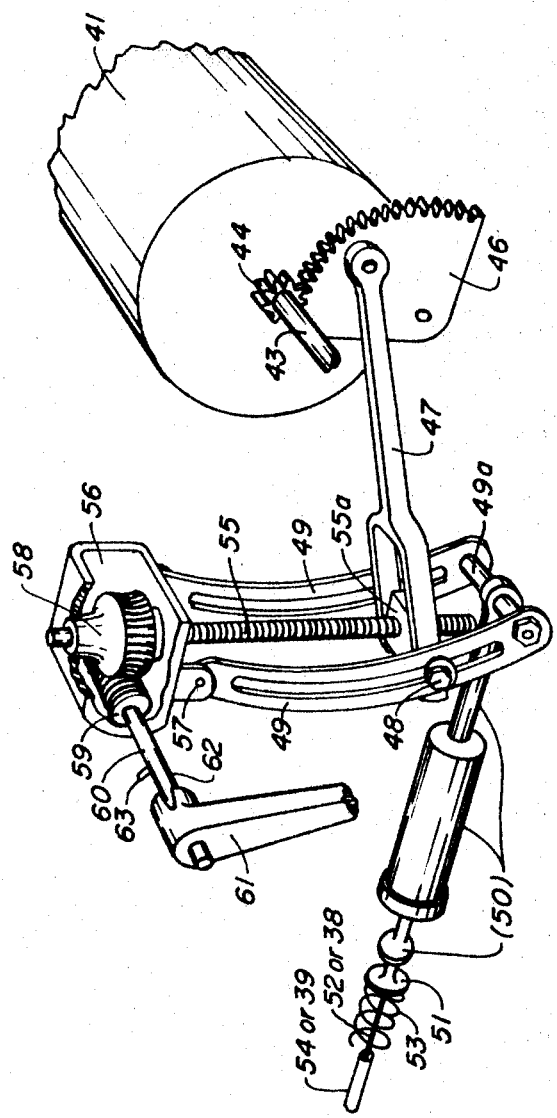
FIGURE 10 is a perspective view of the calibrated cylinder adjustable linkage assembly.

Calibrated cylinder 42 is rotated by an adjustable linkage assembly similar to the mechanism shown in FIGURE 10 and is actuated by cable 38 which moves in sheath 39.

FIGURE 10b shows case 40; cylinders 41 (or 42) which rotate on shaft 43; gear 44 attached to cylinder 41, both of which are rotated by quadrant gear 46; link 47, which imparts motion to quadrant gear 46, is given motion through cable terminal 51 by cable 52.

The shock dampening mechanism shown in FIGURE 10a consists of a case 71 with a suitable connection on one end to pin 49a; a link 72 with a socket connection on one end and a plate on the other end which will move freely in case 71; springs 73 which hold the plate on link 72 in the approximate center of case 71; threaded cap 74 which fits on one end case 71; and spring limiting assembly 75 consisting of a plate and two guide rods which pass through mating holes in the end of case 71 and threaded cap 74.

The operation of the system as it would relate to a concrete mixing operation is as follows: when the component parts of a concrete mixture are loaded into the mixing drum or container of the mixing machine, the added weight of the component parts of the mixture will rotate cranks 14 through links 15 and in turn move the outboard end of lever 18 down thus compressing spring 19 in proportion to the weight of the component parts of the mixture that is in the mixing machine and in turn, lever 18 will pull cable 52 through sheath 54 thus rotating cylinder 41 through quadrant gear 46, link 47, pins 48, slotted levers 49, pin 49a, shock dampening mechanism 50, and cable terminal 51. Spring 53 is so positioned as to hold cable 52 in a retracted position and to take up the slack in cable 52. Thus the quantity of the component parts of the mixture in the mixing machine will be visually shown on the indicating mechanism which may be placed at any desired location such as on the dash of the truck.

With the mixing drum of the concrete mixer empty, the calibrated cylinder 41 is set to indicate zero cubic yards in slotted opening 64 by adjusting the connection of the end of cable 52 to lever 18. With a given load of the component parts of the concrete mixture in the mixing drum, calibrated cylinder 41 is adjusted to indicate the correct quantity of cubic yards in slotted opening 64 as follows: crank 61 is moved laterally on shaft 60 to engage pin 63 in slot 62. Crank 61 is rotated, clockwise or counterclockwise as necessary, thereby raising or lowering threaded block 55a through worm gears 59 and 58 to move pin 48 in a vertical arc in the curved slots in levers 49; slotted levers 49 are movably attached to gear housing 56 on one end by pins 57 and are attached on the other end to shock dampening mechanism link 50 by pin 49a, thereby adjusting this linkage assembly to the extent that cable 52 is taut and cylinder 41 shows the correct number of cubic yards in the slotted opening 64 for the given quantity taken.

On one end of the surface of cylinder 41 is marked the various quantities of the component parts of the mixture that are in the mixing machine. The remainder of this cylinder is calibrated to indicate the corresponding torque required to rotate the mixer drum or paddles for various volumes of concrete at different consistencies, commonly referred to as "slump." At the other end of shaft 43 on which cylinder 41 is mounted is a cylinder 42, the surface of which is marked to indicate the torque being used to rotate the mixing drum or paddles.

A torque measuring device (as shown in FIGURE 4) is placed at any convenient location between the source of power and the mixing drum or paddles. As rotating power is applied to this torque measuring device, shaft 27 rotates flange 28 which in turn rotates flange 31 through a series of flexible connections 33. Flange 28 and flange 31 are held apart by spring 32 to keep flexible connections 33 in a taut condition. Spring 32 is confined between flange 28 and flange 31 and held in a partially compressed condition by flexible connections 33. When light rotating power is applied to shaft 27, the flange 28, flange 31, spring 32 and flexible connections 33 will all rotate as a unit and flange 28 will remain the same distance away from flange 31. As the component parts of the concrete mixture are introduced into the mixer drum or container, the torque required to rotate the mixer drum or container will increase and shaft 30 and flange 31 will lag behind the rotation of flange 28. As flange 31 lags behind flange 28, the flexible connections 33 will pull flange 31 laterally closer to flange 28 thus compressing spring 32. The more torque that is required to rotate the mixing drum or paddles, the closer flange 31 will be pulled laterally toward flange 28 and thus compressing spring 32 in proportion to the torque required. As flange 31 is moved laterally on shaft 30, shaft 34 will be rotated by means of levers 35 which have fingers that track in a groove 36 that is in the hub of flange 31. As shaft 34 rotates, the arm 37 will also rotate and will at the same time pull cable 38 through sheath 39 which in turn will rotate cylinder 42 (FIGURE 7) through gear 44, quadrant gear 46, and connecting link 47, pin 48, slotted levers 49, pin 49a, shock dampening mechanism link 50 and cable terminal 51. Spring 53 is so positioned as to hold cable 38 in a retracted position and to keep the slack out of cable 38. Thus the torque required to turn the mixer drum or paddles will be visually shown on the indicating mechanism which may be placed at any desired location such as on the dash of the truck.

With the mixing drum of the concrete mixer rotating empty, calibrated cylinder 42 is set to indicate zero torque units in slotted opening 66 by adjusting the connection of the end of cable 38 to lever 37. Cylinder 42 is calibrated in torque units which will indicate the torque required to rotate the mixer drum or paddles for any combination of quantity and consistency of concrete therein within the capacity of the mixer drum or container. With a given quantity of the component parts of the concrete mixture at a predetermined consistency in the mixer drum, calibrated cylinder 42 is adjusted to indicate in slotted opening 66 the correct torque units required to rotate the mixer drum or container as follows: crank 61 is moved laterally on shaft 60 to engage pin 63 in slot 62. Crank 61 is rotated, clockwise or counterclockwise as necessary, thereby raising or lowering threaded block 55a through worm gears 59 and 58 to move pin 48 in a vertical arc in the curved slots in levers 49. Slotted levers 49 are movably attached to gear housing 56 on one end by pins 57 and are attached on the other end to shock dampening mechanism link 50 by pin 49a. This linkage assembly is thereby adjusted to the extent that cable 38 is taut and cylinder 42 shows the correct number of torque units in the slotted opening 66 for the volume and consistency of the concrete mixture in the mixer drum or container.

Having described the mechanisms used to measure the quantity of the concrete mixture that is in the mixing machine and the torque required to rotate the mixer drum or paddles, the various markings on the indicating mechanism can be calibrated to show the additional water necessary (if any) that will be required to produce the desired consistency of the concrete. As an example of how these mechanisms work, assume that the indicating mechanism shows that there are 3 cubic yards of concrete in the mixing machine and the indicating mechanism shows 50 torque units are being used to rotate the mixer drum or paddles. By moving the sliding device that is attached to the slotted opening on the front of the indicating mechanism to show a slump of 4 inches through the upper half of the opening therein, the corresponding number on the calibrated cylinder visible through the lower half of the slotted opening in the sliding device will indicate the torque required to produce the desired consistency or "slump" in the concrete mixture. The drier the concrete, the more torque units that will be required to rotate the mixer drum or paddles. To produce a concrete which would require less torque units to rotate the mixer drum or paddles, it would be necessary to add water to the concrete mixture. If the indicating mechanism shows that 50 torque units are being used to rotate the mixer drum or paddles and the calibrated scale on the indicating mechanism shows that 40 torque units are all that is required to rotate the mixer drum or paddles with the 3 cubic yards of concrete having a 4-inch slump, it would be necessary to add water until the torque being used is reduced to the 40 torque units shown on the indicating mechanism which would result in the concrete having the desired 4-inch slump.

Having thus described this mechanical system as a preferred example, various changes may be made, such as spring 19 with its connections to the indicating mechanism may be changed to a hydraulic or electronic system to measure and transmit the quantity of the component parts of the concrete mixture in the mixer drum or container to the indicating mechanism; the torque measuring mechanism may be changed to any system that will indicate the torque being used to rotate the mixer drum, paddles, or container and the indicating mechanism may be changed in shape or form as long as such changes will produce the same results.

While this invention has been described with particular reference to the construction shown in the drawings and while various changes may be made in the detail construction, it shall be understood that such changes shall be within the spirit and scope of the present invention as defined by the appended claims.

Having thus completely and fully described the invention, what is now claimed as new and desired to be protected by Letters Patent of the United States is:

1. A concrete mixing machine consisting of a combination of a mixing drum, means to rotate said mixing drum, means to measure into said mixing drum the quantity of the concrete component parts within said mixing drum, means to measure the torque required to rotate said mixing drum with said component parts therein, means to adjust the consistency of the concrete component parts and means to discharge said concrete component parts from said mixing drum.

2. A concrete mixing machine consisting of a mixing drum with the necessary supporting parts, power means to rotate said mixing drum, means to admit concrete component parts into said mixing drum, means to measure the total quantity of said component parts that are within the mixing drum while the mixing drum is stationary or in motion, means to measure the torque required to rotate said mixing drum while said mixing drum is in motion, means to adjust the consistency of the concrete component parts, and means to discharge said concrete component parts from said mixing drum.

3. A concrete mixing machine consisting of a mixing drum, means to movably support said mixing drum, power means to rotate said mixing drum, means to admit concrete component parts into said mixing drum, means to measure the total quantity of the concrete component parts while the mixing drum is stationary or in motion, means to transfer said measurement to a gauge or calibrated instrument located at a desired location, means to measure the torque required to rotate said mixing drum with said component parts therein, means to transfer said measurements to a gauge or calibrated instrument located at a desired location, means to adjust the consistency of the concrete component parts, and means to discharge the concrete component parts from said mixing drum.

4. A concrete mixing machine consisting of a mixing drum, means to movably support said mixing drum, power means to rotate said mixing drum, means to admit concrete component parts into said mixing drum, means to measure the total quantity of the concrete component parts that are in the mixing drum while the mixing drum is stationary or in motion by inserting a set of springs between said mixing drum and a support base, means to transfer said measurements to a gauge or calibrated instrument located at a desired location, means to measure the torque required to rotate said mixing drum with the concrete component parts that are in the mixing drum while said mixing drum is in motion by placing a torque measuring device between the source of power and the said mixing drum, means to transfer said measurements to a gauge or calibrated instrument located at a desired location, means to adjust the consistency of the concrete component parts, and means to discharge concrete component parts from said mixing drum.

5. A concrete mixing machine consisting of a mixing drum, means to movably support said mixing drum, power means to rotate said mixing drum, means to admit concrete component parts into said mixing drum, means to measure the total quantity of the concrete component parts that are in the mixing drum while the mixing drum is stationary or in motion by inserting a set of springs between said mixing drum and a support base, means to transfer said measurements to an adjustable gauge or calibrated instrument located at a desired location, means to absorb the effects of impact upon the indicating mechanism means to adjust said gauge or calibrated instrument, means to measure the torque required to rotate said mixing drum with the concrete component parts that are in said mixing drum while said mixing drum is in motion by placing a torque measuring device between the source of power and said mixing drum, means to transfer said measurement to an adjustable gauge or calibrated instrument located at a desired location, means to absorb the effects of impact upon the indicating mechanism, means to adjust said gauge or calibrated instrument, means to select the desired consistency of the concrete component parts that are in the mixing drum and the torque required to rotate said mixing drum containing the concrete component parts, means to alter the consistency of the total concrete component parts that are in the mixing drum so as to meet the desired consistency, and means to discharge said component parts from said mixing drum.

References Cited

UNITED STATES PATENTS

| | | | |
|---|---|---|---|
| 1,730,893 | 10/1929 | Lichtenberg | 259—149 |
| 3,167,307 | 1/1965 | Martinson | 259—154 |

ROBERT W. JENKINS, Primary Examiner

J. M. BELL, Assistant Examiner

U.S. Cl. X.R.

137—92; 259—149